US008689184B2

(12) United States Patent
Storer et al.

(10) Patent No.: US 8,689,184 B2
(45) Date of Patent: Apr. 1, 2014

(54) APPARATUS, SYSTEM, AND METHOD FOR MANAGING INDUSTRIAL SOFTWARE CONFIGURATIONS

(75) Inventors: Timothy Aaron Storer, Cincinnati, OH (US); Michael Wayne Ogden, Memphis, TN (US)

(73) Assignee: The Procter & Gamble Company, Cincinnati, OH (US)

( * ) Notice: Subject to any disclaimer, the term of this patent is extended or adjusted under 35 U.S.C. 154(b) by 102 days.

(21) Appl. No.: 13/416,423

(22) Filed: Mar. 9, 2012

(65) Prior Publication Data

US 2012/0254836 A1    Oct. 4, 2012

Related U.S. Application Data

(60) Provisional application No. 61/469,124, filed on Mar. 30, 2011.

(51) Int. Cl.
*G06F 9/44* (2006.01)

(52) U.S. Cl.
USPC ............ 717/120; 717/121; 717/143; 717/144

(58) Field of Classification Search
None
See application file for complete search history.

(56) References Cited

U.S. PATENT DOCUMENTS

| | | | | |
|---|---|---|---|---|
| 5,504,902 | A * | 4/1996 | McGrath et al. | 717/146 |
| 5,530,863 | A * | 6/1996 | Hino | 717/146 |
| 5,991,774 | A * | 11/1999 | Tate et al. | 707/697 |
| 6,282,699 | B1 * | 8/2001 | Zhang et al. | 717/109 |
| 6,473,794 | B1 * | 10/2002 | Guheen et al. | 709/223 |
| 7,610,233 | B1 * | 10/2009 | Leong et al. | 705/37 |
| 7,844,957 | B2 * | 11/2010 | Doucette et al. | 717/140 |
| 8,074,201 | B2 * | 12/2011 | Ghercioiu et al. | 717/107 |
| 8,239,848 | B2 * | 8/2012 | Ghercioiu et al. | 717/162 |
| 2004/0034846 | A1 | 2/2004 | Ortal et al. | |
| 2004/0098408 | A1 | 5/2004 | Gensel | |
| 2006/0161880 | A1 | 7/2006 | Saad et al. | |
| 2007/0168932 | A1 * | 7/2007 | Seeger et al. | 717/105 |
| 2008/0120591 | A1 | 5/2008 | Clemm et al. | |
| 2008/0148225 | A1 * | 6/2008 | Sarkar et al. | 717/107 |
| 2008/0222603 | A1 * | 9/2008 | Shaw et al. | 717/120 |
| 2009/0158272 | A1 | 6/2009 | El-Assir et al. | |
| 2009/0300151 | A1 * | 12/2009 | Friedman et al. | 709/222 |
| 2009/0307661 | A1 | 12/2009 | Vierzba et al. | |
| 2011/0161922 | A1 | 6/2011 | Gerken | |
| 2011/0258616 | A1 * | 10/2011 | Sollich | 717/146 |
| 2012/0151444 | A1 * | 6/2012 | Weissman | 717/122 |

FOREIGN PATENT DOCUMENTS

| | | |
|---|---|---|
| FR | 2 900 748 A1 | 11/2007 |
| JP | 2009-064092 | 3/2009 |
| WO | WO 01/73546 A2 | 10/2001 |

OTHER PUBLICATIONS

PCT International Search Report dated Jul. 9, 2012, 9 pages.

* cited by examiner

*Primary Examiner* — Chameli Das
(74) *Attorney, Agent, or Firm* — Andrew J. Mueller; Abbey Lopez

(57) ABSTRACT

An apparatus, system, and computer-implemented method of managing a software program. The computer comprises a processor, a memory, and an input/output interface for receiving and transmitting information to and from the processor, the computer providing a development environment for developing a set of instructions executable by a system. The processor receives a first program containing information in machine-readable form. The information represents a first set of instructions executable by the system. A configuration is created for the system based on the received information. The processor generates a second program containing a second set of instructions executable by the system based on the configuration. The second set of instructions corresponds to at least one algorithm assembled in a nested hierarchy.

13 Claims, 11 Drawing Sheets

| File | Edit | Window | Help | |
|---|---|---|---|---|
| | | Structure | | |
| | | | | Options and Variants |
| | | | | |
| | | Library | | |
| Application | | | | |

Fig. 9

APPARATUS, SYSTEM, AND METHOD FOR MANAGING INDUSTRIAL SOFTWARE CONFIGURATIONS

CROSS REFERENCE TO RELATED APPLICATION

This application claims the benefit of U.S. Provisional Application No. 61/469,124, filed on Mar. 30, 2011, which is herein incorporated by reference in its entirety.

BACKGROUND OF THE INVENTION

In one aspect, the present disclosure relates generally to a system and method for managing software configurations. More specifically, the present disclosure relates to a system and method for managing configurations of software for industrial control systems.

Industrial control systems are used in a variety of control applications, such as manufacturing and materials handling. An industrial control system typically employs several industrial controllers and computers. Typically, the industrial controller is in communication with several devices such as networked control devices, overload relays, network expanders, sensors and other input devices, and an interface for integrating additional components.

Each industrial controller component of the industrial control system performs specific functions for controlling various devices, such as motors, valves, actuators, and so forth, depending upon the particular application. Typically, an industrial controller has various modules such as a central controller, a memory, and a communications device. The central controller of an industrial controller typically executes program files associated with the various devices that are in communication with the industrial controller. The communications device facilitates communication, over one or more communication lines, with the various devices that are controlled by the industrial controller. Examples of communication modules include, without limitation, Ethernet controllers, DeviceNet controllers, ControlNet controllers, FireWire controllers, FieldBus controllers, among others. The memory stores data used for controlling the associated devices.

Algorithms associated with the executable program files associated with the various devices that are in communication with the industrial controller are generally compiled and downloaded to the industrial controller in a single file structure. Conventional techniques for managing such executable program files include applications to enable copying monolithic algorithms into a single controller file as generic objects, automatically configuring parameters within a file in a proprietary programming language, and storing multiple algorithm versions. Once the single file structure (monolithic algorithm) is created and stored, however, conventional techniques for managing executable program files do not enable modifications to the single file structure. Accordingly, such conventional techniques do not enable the application of options, variants, and parameters to the executable program files and do not enable the underlying algorithms to be reconfigured in a nested structure. Furthermore, conventional techniques for managing executable program files for industrial control systems do not enable relationship, versioning, and configuration management of the modified file structures.

SUMMARY OF THE INVENTION

In one aspect, a computer-implemented method of managing a software program. The computer comprises a processor, a memory, and an input/output interface for receiving and transmitting information to and from the processor. The computer provides a development environment for developing a set of instructions executable by a system. The processor receives a first program containing information in machine-readable form where the information represents a first set of instructions executable by the system. A configuration is created for the system based on the received information. The processor generates a second program containing a second set of instructions executable by the system based on the configuration, wherein the second set of instructions corresponds to at least one algorithm assembled in a nested hierarchy.

BRIEF DESCRIPTION OF THE DRAWINGS

FIG. 9 is a typical computer user interface window of a typical enterprise software platform environment implemented on the computer system shown in FIG. 2.

DETAILED DESCRIPTION OF THE INVENTION

The present disclosure describes various aspects of a computer-implemented system and method for managing software configurations. More specifically, the present disclosure relates to a system and method for managing configurations of software for industrial control systems. In accordance with the present disclosure, a computer-implemented system and method manages discrete control algorithms, compiling and instantiating them based on real, physical characteristics of the production equipment coupled to the industrial control system.

Aspects of the computer-implemented system and method are described herein in the context of executable software programs developed and managed within an enterprise software platform. In one aspect, the executable software programs are used in an industrial control system. In one aspect, the enterprise software platform is Product Lifecycle Management (PLM) platform, such as the Teamcenter Unified Architecture V8.3 PLM platform by Siemens. Nevertheless, the techniques disclosed herein are not limited as such and are considered extensible to other enterprise software platforms and environments.

In one aspect, the computer-implemented system and method for managing industrial software configurations provides improvements over conventional software management techniques by reducing the number of programming errors, increasing availability of proven software, decreasing time-to-market, and improving equipment standardization. In accordance with the present disclosure, the computer-implemented system and method provides version traceability, relationship management between software algorithms and mechanical equipment, workflow management for testing, release, and update, access security based on user "Role," options and variance, and automatic generation of configuration hierarchy in downloadable output file(s).

Although various techniques are described hereinbelow in the context of an industrial control system and specific enterprise software platform, the scope of such techniques are not limited thereto. Accordingly, it is to be understood that this disclosure is not limited to particular aspects or embodiments described herein, as such may vary. It is also to be understood that the terminology used herein is for the purpose of describing particular aspects or embodiments only, and is not intended to be limiting, since the scope of the computer-implemented system and method for managing industrial software configurations is defined solely by the appended claims.

Figure 1:
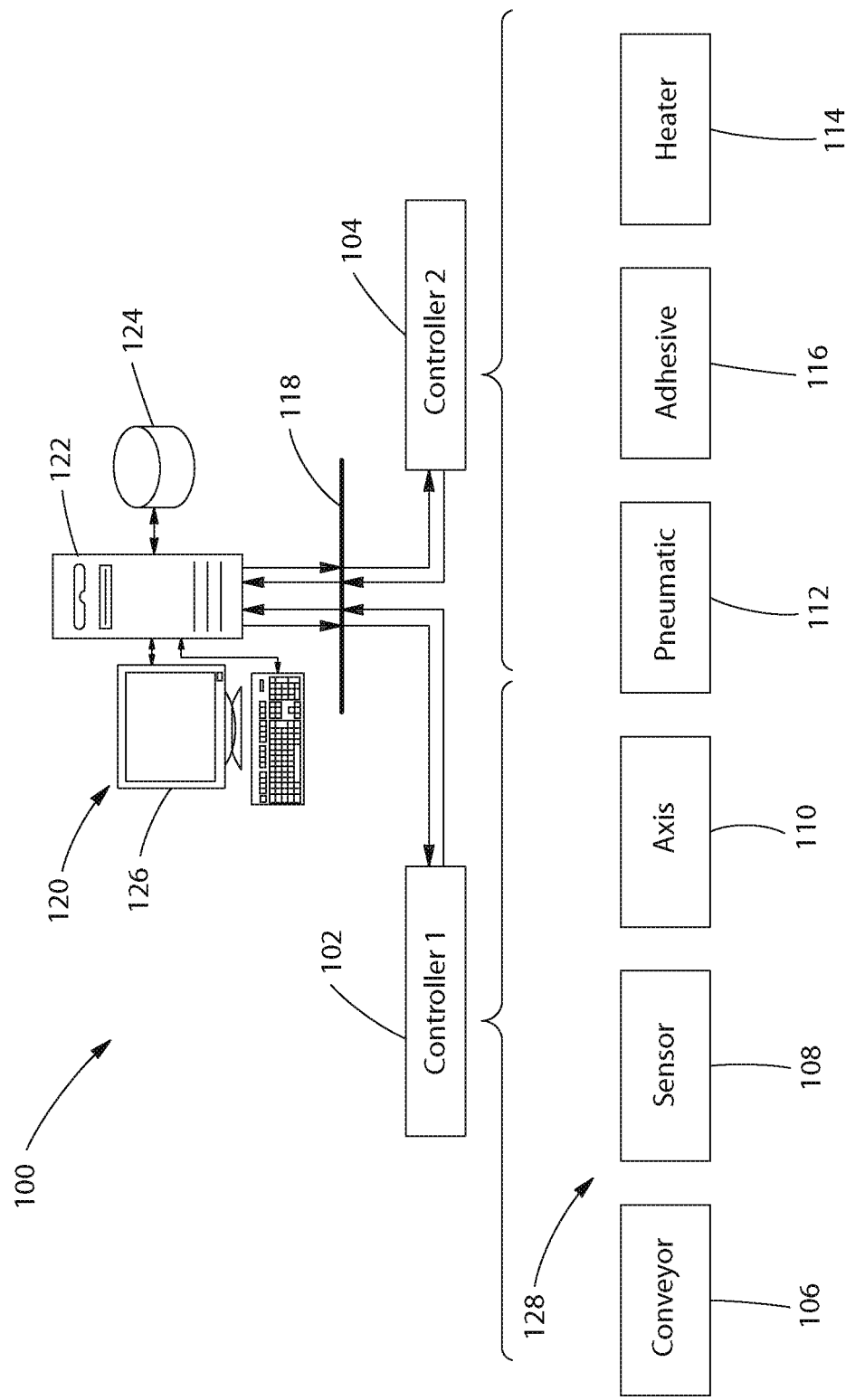
FIG. 1 is a diagram of one aspect of an industrial control system for controlling manufacturing and materials handling functions of a production line.

FIG. 1 is a diagram of one aspect of an industrial control system for controlling manufacturing and materials handling functions of a production line. The illustrated industrial control system 100 employs several industrial controllers 102, 104 and one or more computer systems 120 to control the production line 128. It will be appreciated that industrial controllers 102, 104 may be any device that monitors and affects the operational conditions of a given dynamical system, such as the industrial control system 100, where a system is an entity that functions to execute sub-processes and commands. As used herein, the term "controller" is intended to cover any computational device, server, or database, which can interpret executable instructions. The industrial controllers 102, 104 are in communication with several devices such as networked control devices, overload relays, network expanders, sensors and other input devices, and an interface for integrating additional components. The industrial controllers 102, 104 are in communication with the computer system 120 through a communications network 118 or industrial bus. The computer system 120 includes a server 122, a mass storage device 124, and a monitor 126, generally.

Each of the industrial controllers 102, 104 perform specific functions that enable the industrial control system 100 to control various devices, such as motors, valves, actuators, and so forth, depending upon the particular application. In the illustrated industrial control system 100, the first industrial controller 102 is configured to control a conveyer 106, one or more sensors 108, and an axis 110 of rotation associated with the production line 128. The second industrial controller 104 is configured to control pneumatics 112, adhesives 114, and heaters 116 associated with the production line 128. Typically, each of the industrial controllers 102, 104 may include various modules such as a central controller, a memory, and a communications device, described in more detail below with reference to FIG. 2. The central controller module typically executes program files associated with the various devices that are in communication with the industrial controllers 102, 104 such as the conveyer 106, sensors 108, axis 110, pneumatics 112, adhesives 114, and heaters 116 of the production line 128. It will be appreciated that a program is any sequence of instructions that the industrial controllers 102, 104 can interpret and execute. The communication device module of the industrial controllers 102, 104 facilitates communication over one or more communication lines, with the various devices that are controlled by the industrial controllers 102, 104. Examples of communication device modules include, without limitation, Ethernet controllers, DeviceNet controllers, ControlNet controllers, FireWire controllers, or FieldBus controllers and the like. The storage module stores data for controlling the associated devices controlled by the industrial controllers 102, 104.

Figure 2:
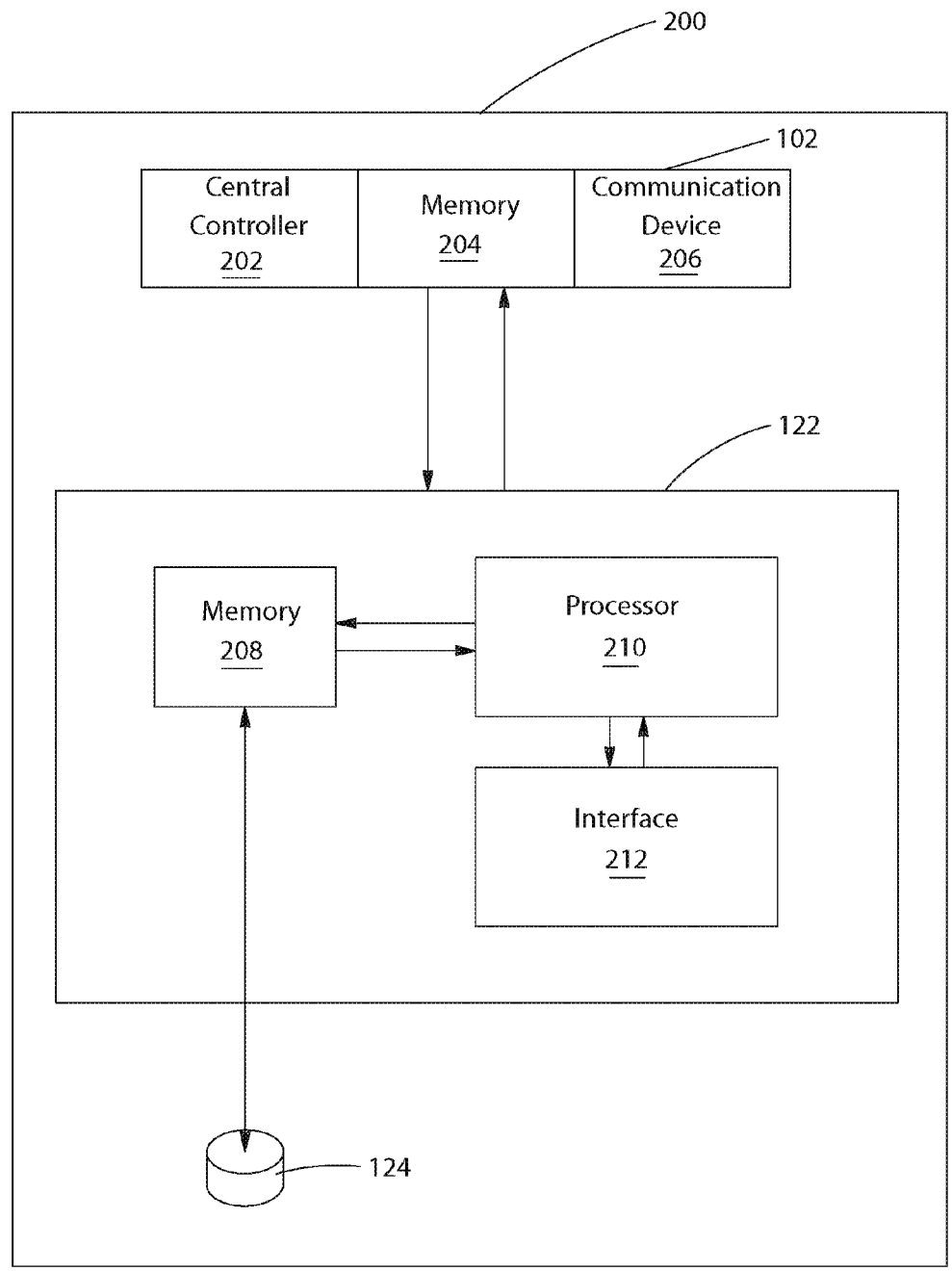
FIG. 2 is a diagrammatic representation of one aspect of an industrial control system.

FIG. 2 is a diagrammatic representation of one aspect of an industrial control system. The illustrated industrial control system 200 comprises an industrial controller 102 and a computer system 122 in communication therewith. The Industrial controller 102 includes a central control module comprising a central controller 202, a storage module comprising a first memory 204, and a communication module comprising a communication device 206. Although the memory 204 is shown separately, the memory 204 may be a part of the central controller 202. The central controller 202 is operative to control multiple devices by executing various software programs. The memory 204 is configured to store data such as programmable data including operating programs for operating the central controller 202 for controlling an industrial process, and configuration data used by the operating program and control program. The memory 204 also may store individual programmable data for each module in the industrial controller 200. The communication device 206 facilitates communication with the computer system 122. In one aspect, the communication device 206 comprises an Ethernet card.

In one aspect, the industrial controller 102 will typically utilize a real-time operating system that provides deterministic operation. Control is generally treated as the highest priority, and the central controller 202 provides predictable, repeatable response based upon the program instructions stored in the memory 204, and upon inputs received from sensors and other input devices, operator instructions, and so forth.

The computer system 122 is separate from the industrial controller 102, and includes components and software that permit it to automatically access certain designated data from the industrial controller 102 and retrieve the data, review, monitor, and so forth. The computer system 122 may be physically situated near the industrial controller 102, or may be remote from it, such as in a monitoring station in a facility or factory, or even off-site, such as in a management office or data repository. The computer system 122 may include, among other components, a processor 210, a memory 208, and an interface 21. A user employs the computer system 122 to configure the various modules of the industrial controller 102 and to control the various devices that are coupled to the industrial control system 200. To do so, specialized applications are executed by the processor 210 to communicate with the industrial controller 102 and the devices connected to the industrial control system 200. The memory 208 is used for data storage and in one aspect may be coupled to a database 124. Unlike the industrial controller 102, the computer system 122 may run a conventional operating system without real-time, deterministic requirements. The computer system 122 will typically run applications software configurable to permit the desired access to, modification of, and compilation of software programs from the industrial controller 102.

The computer system 122 is operative to automatically access the data from the memory 204 of the industrial controller 102 via the communication device 206 and to store the data in the memory 208 or the database 124 of the computer system 122. In one aspect, the application is configured to access the data during operation of the industrial control system 200 without altering the operational state of the industrial control system 200. In one aspect, a user may be provided with a virtual representation of the industrial controller 102 and the various modules associated therewith via the interface 212.

The interface 212 appears on a browser that is displayed on a monitor of the computer system 122, such as the monitor 126 shown in FIG. 1. A user may control the various modules or components of the industrial controller 102 by way of the interface 212. The Interface 212 includes several virtual modules similar to the modules present in an industrial controller, such as the industrial controller 102 described above. For example, the memory 208 corresponds to the memory 202 of the industrial controller 102. Similarly, a virtual representation of a controller module, which may permit configuration with the controller itself, corresponds to the central controller 202, and I/O modules correspond to the communication device 206 of the industrial controller 102.

In one aspect, the disclosed industrial control system 200 may be implemented on any suitable enterprise software platform environment such as the Product Lifecycle Management (PLM) Components, for example, that enable diverse manufacturing enterprises to seamlessly share information and data regardless of the PLM applications used by different entities in the organization. One example of a PLM component is the Teamcenter Unified Architecture V8.3 by Siemens, although the disclosed computer-implemented system and method may be applied to other PLM systems, or other industrial control system enterprise software platforms. In one aspect, the software for the disclosed industrial control system 200 may be developed using the Rockwell Automation ControlLogix5000™ V18 programming software or any suitable industrial control system programming software development platform suitable for the specific industrial controller 102 used to implement the industrial control system 200. In one aspect, the Rockwell Software® RSLogix5000™ programming software provides integrated motion on EtherNet/IP and high-integrity add-on instructions. The software enables those skilled in the art to access all the features and benefits of an integrated motion solution for configuring, programming, commissioning and maintaining high-performance drives, I/O, smart actuators and other devices on a single EtherNet/IP network. The enterprise software programming platform avoids the use of a dedicated motion network and can lower system costs while providing simplified synchronization of industrial controllers 102 and drives for improved performance of the industrial control system 200. In other aspects, other industrial controller software development platforms may be employed to implement the industrial control system 200. In one aspect, the computer system 122 includes at least 4 GB RAM and a 2 GHz processor. Although various techniques are described herein in the context of a PLM environment suitable for implementing an industrial control system, the techniques associated with the computer-implemented system and method in accordance with the present disclosure may be extensible to other software environments, without limitation.

Figure 3:
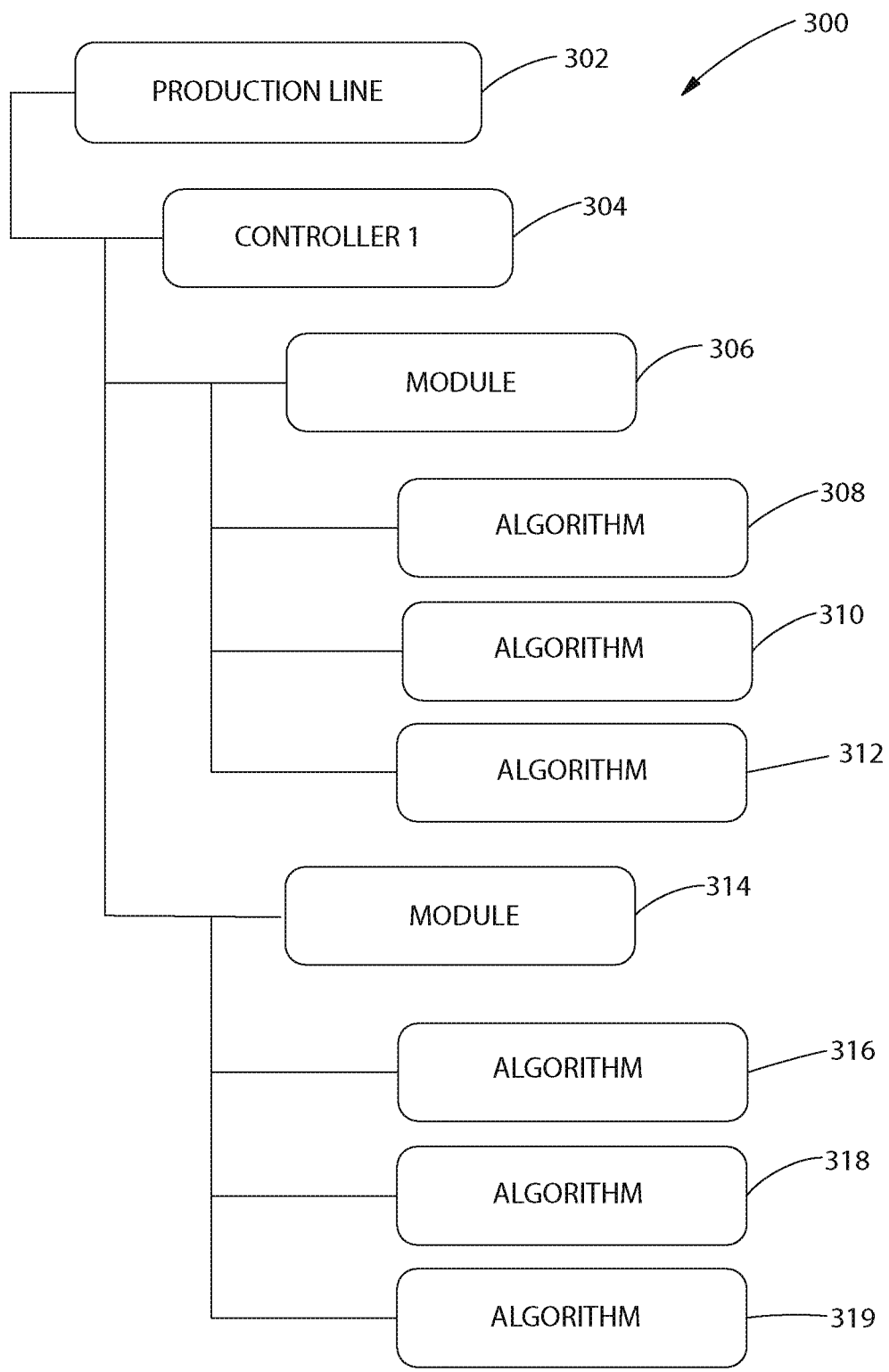
FIG. 3 illustrates a generic configuration of a software program for an industrial control system such as the industrial control systems shown in FIGS. 1 and 2 in a nested hierarchy.

FIG. 3 illustrates a generic configuration 300 of a software program for an industrial control system such as the industrial control systems 100, 200 shown in FIGS. 1 and 2 in a nested hierarchy. A software program developed for a particular production line 302 can be configured using one or more controllers 304 and one or more modules 306, 314, where each module 304, 314 can be further configured as one or more respective algorithms 308, 310, 312 and 316, 318, 319. In one aspect, a software program may be automatically generated at the controller 304 level and may be saved as a programmable logic controller (PLC) downloadable program. The modules 306, 314 and corresponding algorithms 308, 310, 312 and 316, 318, 319 can be exchanged via drag-and-drop through the interface 212 of the computer system 122 shown in FIG. 2. The modules 306, 314 and corresponding algorithms 308, 310, 312 and 316, 318, 319 can be revised (revisions) with full traceability. The algorithms 308, 310, 312, 316, 318, 319 have options and variants associated with them which can be manipulated by the user to modify the contents of the algorithms 308, 310, 312, 316, 318, 319 to reflect the correct equipment instance on the production line 128 shown in FIG. 1. All class relationships are maintained such that the overall configuration 300 is also version-managed. In one aspect, the nested hierarchy of modules 306, 314 and algorithms 308, 310, 312, 316, 318, 319 is maintained in a software output file.

Figure 4:
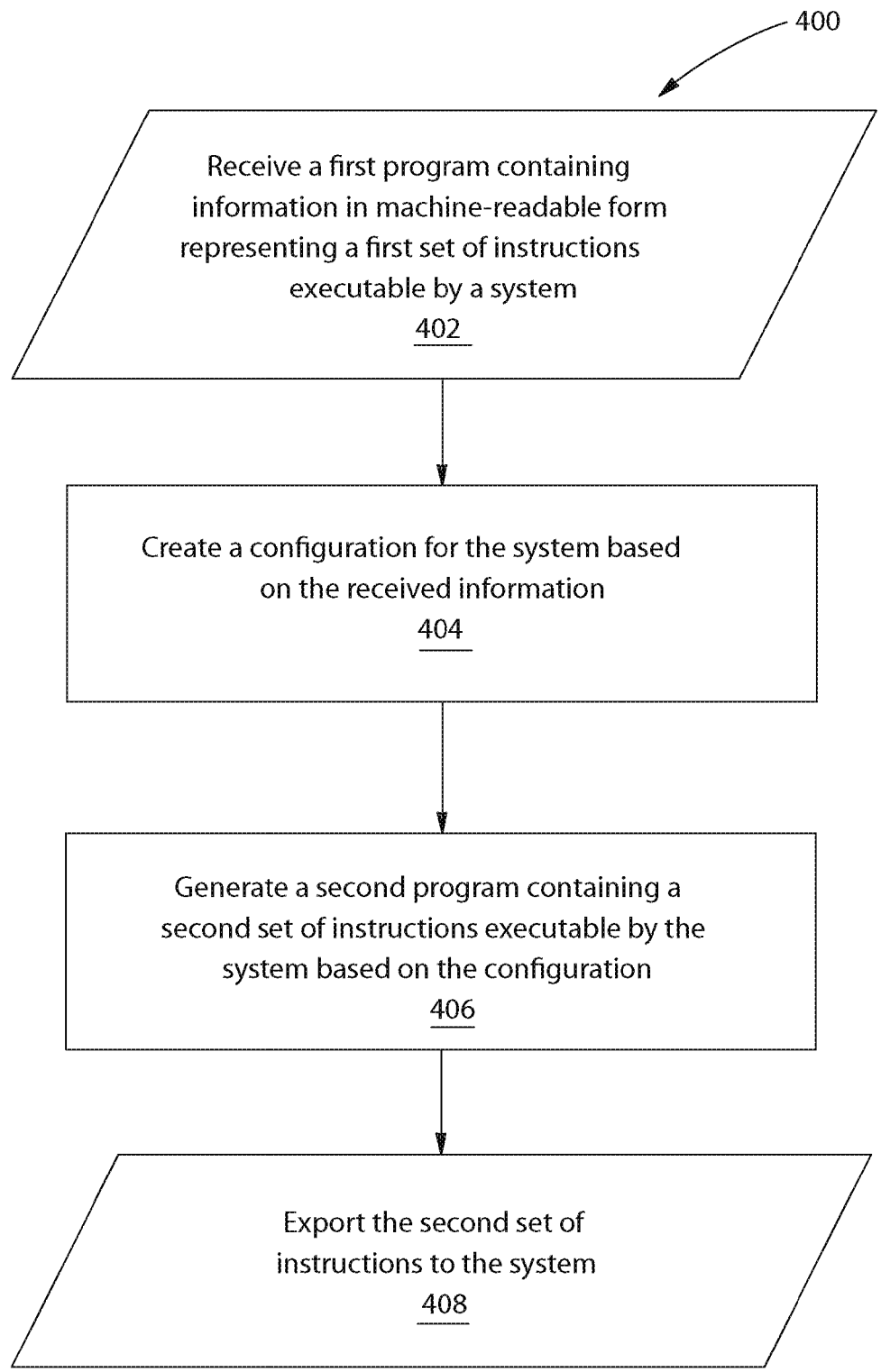
FIG. 4 is a logic diagram of a computer-implemented process of managing a software program.

FIG. 4 is a logic diagram of a computer-implemented process 400 of managing a software program. With reference now to FIGS. 1-4, in one aspect, the computer system 122 comprises a processor 210, a memory 208, and an input/output interface 212 for receiving and transmitting information to and from the processor 210. The computer system 122 provides a software development environment for developing a set of instructions executable by a system, such as the industrial controller 102, for example, without limitation. It will be appreciated that in various aspects, the system may refer to any controller, computational device, server, or database, which can interpret executable instructions. In the context of the present disclosure, the system is implemented as the industrial controller 102. The scope of the present disclosure, however, is not limited in this context.

In one aspect of the process 400, at 402 the processor 210 receives a first program containing information in machine-readable form, where the information represents a first set of instructions executable by the system, e.g., the industrial controller 102. A configuration is created at 404 for the system based on the received information. At 406, the processor 210 generates a second program containing a second set of instructions executable by the system based on the configuration, where the second set of instructions correspond to at least one algorithm assembled in a nested hierarchy. At 408, the processor 210 exports the second set of instructions to the system.

In accordance with one aspect of the computer-implemented process 400, the processor 210 parses the first program to extract data associated with the information contained therein. The processor 210 then creates a metadata program and stores the data extracted from the information contained in the first program in the metadata program in the memory 208 or the database 124. In one aspect, to parse the first program, the processor 210 interprets hierarchy definition data from the information contained in the first program, identifies fields which may require definition, and determines a category for the algorithm represented by the information.

In one aspect, to create the configuration for the system based on the received information, the processor 210 creates a logical structure representing a physical environment in which the system will be applied and the functional capabilities of the system. The processor 210 then associates at least one algorithm with the logical structure. In another aspect, to create the configuration for the system based on the received information, the processor 210 locates the at least one algorithm associated with the logical structure in a nested hierarchy. In yet another aspect, to create the configuration for the system based on the received information, the processor 210 configures any one of an option, variant, and parameter data associated with the at least one algorithm within the logical structure.

In one aspect, to generate the second program containing the second set of instructions executable by the system based on the configuration, the processor 210 applies any of the previously configured option, variant, and parameter data to the at least one algorithm within the logical structure. In one aspect, to apply any of the option, variant, and parameter data to the at least one algorithm within the logical structure, the processor 210 manipulates the extracted information in the at least one algorithm with at least one of the option, variant, and parameter data. In one aspect, the processor 210 instantiates the at least one algorithm, assembles the instantiated at least one algorithm, and compiles the assembled instantiated at least one algorithm into a single program, wherein the single program is downloadable to the system, e.g., the industrial controller 102.

Having described the computer-implemented process in general terms, the disclosure now turns to one non-limiting example of a computer-implemented process 400 of managing a software program where a PLC software generation application can be created within the computer system 122 for use by the industrial controller 102 used in the industrial control systems 100, 200 shown in FIGS. 1 and 2. In one aspect, the computer system 122 provides an enterprise software platform environment such as Siemens PLM Teamcenter Unified Architecture (TcUA) for use on Rockwell Automation's ControlLogix™ .XML platform for the industrial controller 102, for example. This approach, however, is non-limiting and may be extensible to other enterprise software platforms, programming languages, and industrial controllers with slight modification of the code generation algorithm. Accordingly, the present disclosure is not limited in this context.

Figure 5:
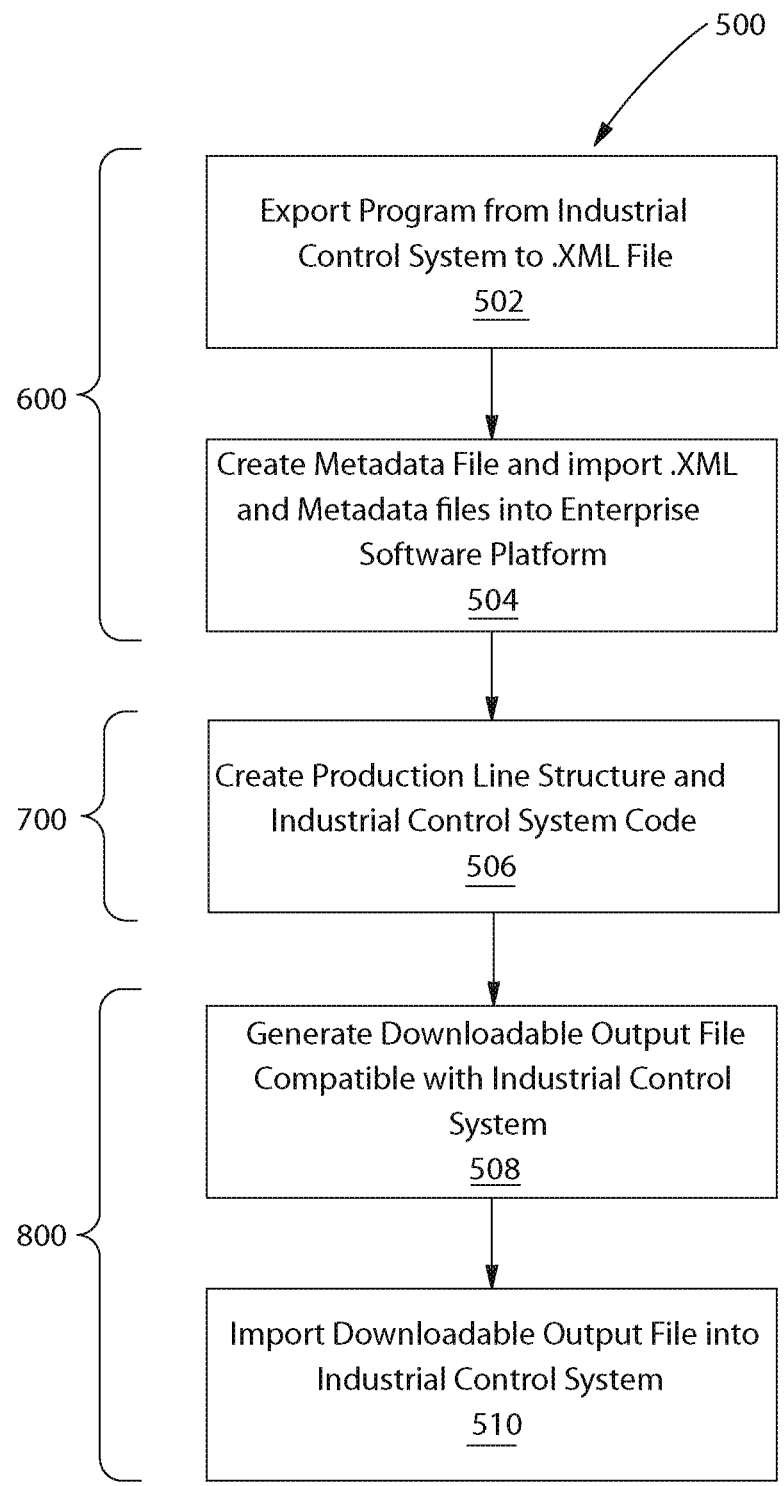
FIG. 5 is an overall logic diagram of a computer-implemented process of managing a software program.

Accordingly, FIG. 5 is an overall logic diagram 500 of a computer-implemented process of managing a software program. With reference now to FIGS. 1-5, in one aspect, at 502 the processor 210 exports programs from the industrial controller 102 and are imported to the memory 208 of the computer system 122. In one aspect, the industrial controller 102 program is configured as an .XML file and is exported from the ControlLogix™ .XML platform. At 504, a metadata file is automatically created by the processor 210 and the .XML file is imported into the PLM TcUA enterprise software platform programming environment as a business item object. Logic diagram 600 shown in FIG. 6 provides a detailed implementation of the functionality described in 502 and 504, without limitation.

Figure 7:
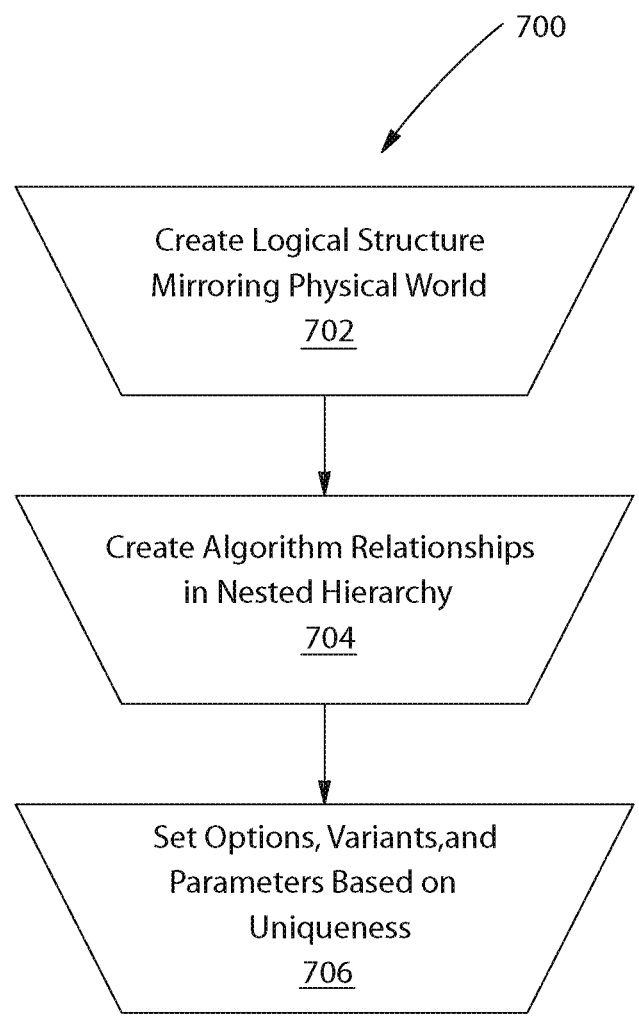
FIG. 7 is a detailed logic diagram for creating production line configurations.

At 506, production line structure and industrial control system code is created by the processor 210. Logic diagram 700 shown in FIG. 7 provides a detailed implementation of the functionality described in 506, without limitation.

Figure 8:
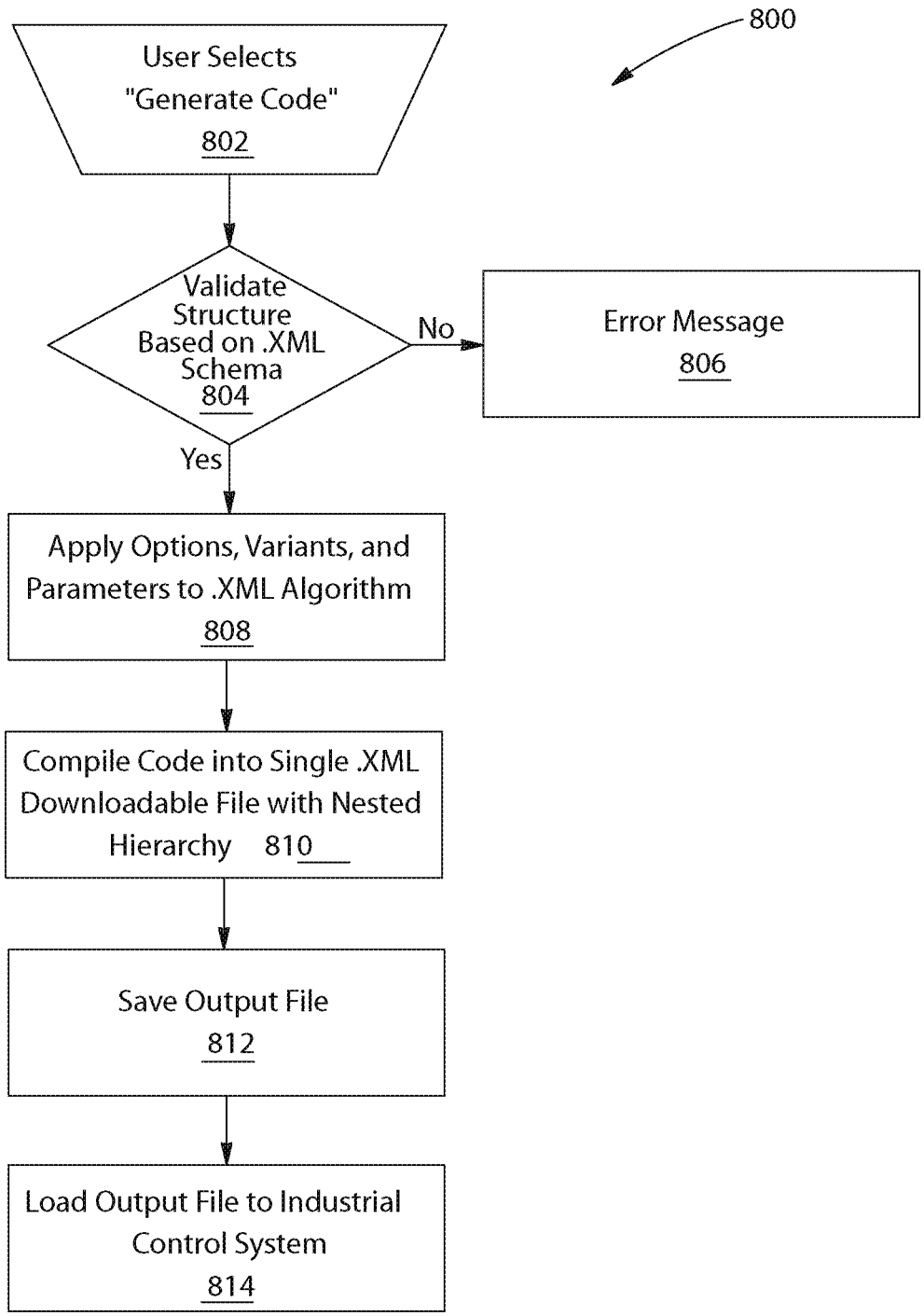
FIG. 8 is a detailed logic diagram for automatically generating a downloadable output file compatible with an industrial control system and importing the output file into the industrial control system.

At 508, a downloadable output file compatible with the industrial control system is automatically generated by the processor 210. For example, the downloadable output file may be a PLC file. At 510, the downloadable output file is imported into the industrial controller 102. Logic diagram 800 shown in FIG. 8 provides a detailed implementation of the functionality described in 508 and 510, without limitation.

Figure 6:
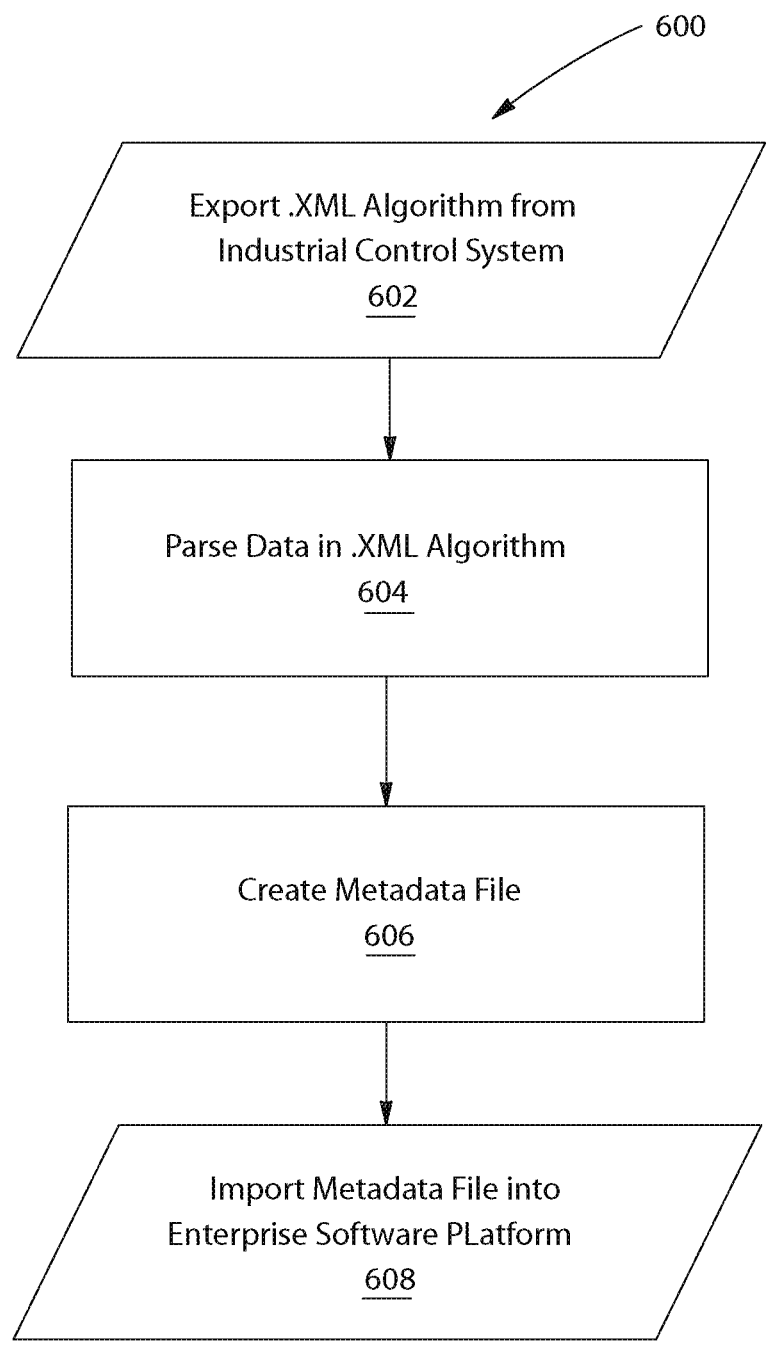
FIG. 6 is a detailed logic diagram for bringing data from an industrial controller into a computer system.

FIG. 6 is a detailed logic diagram 600 for bringing data from an industrial controller into a computer system. With reference to FIGS. 1-6, at 602, the processor 210 exports an .XML algorithm from the industrial controller 102 to the memory 208 of the computer system 122. At 604, during the import process, the .XML algorithm is parsed by a parsing utility executed by the processor 210. The parsing utility queries the .XML algorithm, interprets the hierarchy definition (in this case program, routine, or add-on-instruction), and identifies all potential fields which may require definition as well as whether the extracted algorithm can be categorized as logic or motion. At 606, the processor 210 automatically creates a metadata file. The interpreted hierarchy data is stored in the metadata file associated to the .XML algorithm. At 608, the .XML algorithm and the metadata file are stored in the memory 208 of the computer system 122 and thus are imported into the computer system 122. In one aspect, the .XML algorithm and the metadata file may be stored in the database 124 of the computer system 122.

In one aspect, an enterprise software platform environment (e.g., PLM TcUA) is implemented on the computer system 122. In one aspect, the stored algorithms are kept in the database 124 and are subject to standard program management practices. In accordance with such standard program management practices, multiple revisions of the object being managed are tracked. In mechanical applications, this may include tracking assemblies and components. In the context of the present disclosure, however, multiple revisions of software components are tracked. Also, complex relationships between objects being managed are tracked by the computer system 122. In a mechanical application, the program environment of the computer system 122 may allow for the possible differences in how an assembly is put together by managing the relationships to its components. Additionally, workflow processes may be implemented that allow objects to be released that fit with current business processes being implemented on the production line 128 (FIG. 1). The computer system 122 also provides the capability for collaboration and process improvement among a number of different organizations. The computer system 122 also provides for securing business critical data in a complex multi organizational environment. In the context of the present disclosure, for example, software components designated as "trade secrets" or patented algorithms may be secured from other vendors or competitors.

FIG. 7 is a detailed logic diagram 700 for creating production line configurations. With reference now to FIGS. 1-7, at 702, a user of the enterprise software platform environment implemented on the computer system 122 is able to create logical structures of production line 128 configurations with functional capabilities that reflect the physical world and can "attach" software algorithms from the database 124 directly onto the logical structure. Algorithms are queried based on a predefined "Saved Search." The metadata file created at 504 (FIG. 5) or at 606 (FIG. 6) does not permit algorithms to be placed incorrectly in the nested hierarchy, for example, an instruction cannot be the parent of a routine, to ensure that the structure is valid. At 704, the relationships between algorithms are created in a nested hierarchy. In various aspects, relationships between objects can be set manually by the user and maintained automatically by within the enterprise software platform environment implemented on the computer system 122 such that related algorithms can always be placed simultaneously into the logical structure. At 706, with the structure and algorithms complete, users can set options, variants, and parameters within the enterprise software environment "Structure Manager," "Options and Variants," "Library," and "Application" user interface window 900, shown in FIG. 9, of a typical enterprise software platform environment implemented on the computer system 122 shown in FIG. 2.

FIG. 8 is a detailed logic diagram 800 for automatically generating a downloadable output file compatible with an industrial control system and importing the output file into the industrial control system. With reference to FIGS. 1-8, at 802, upon request by the user to "Generate Code," the system walks the logical structure, extracting the appropriate .XML information from each algorithm and replacing values based on the parameters, options, and variants. Value which can be replaced include fields which may require definition (names or values), numeric values within a file, or whole segments of .XML code can be inserted or removed. Original values which are to be replaced are done so as a "relative reference" such that regardless of the original value, the field is updated with the user-defined set-up value. At 804, the system determines whether the structure based on the .XML schema is valid. If the structure is not valid, an error message is output at 806. If the structure is valid, at 808 options, variants, and parameters are applied to the .XML algorithms. As the .XML algorithms are instantiated, at 810 .XML algorithms are also compiled and assembled into a single .XML downloadable PLC file mimicking the logical tree structure. Since any type of algorithm (program, routine, instruction) can be added to the file, the .XML algorithms are compiled and assembled into a nested hierarchy. Motion algorithms are unique in that they also insert the appropriate hardware modules and members into multiple locations within the downloadable output file (e.g., PLC file) during code generations. This complex insertion requires additional metadata automatically generated for motion objects. At 812, once a single .XML downloadable output file has been generated, it is stored in the PLM database 124 and at 814 can be imported directly into the industrial controller 102 for use in production operations such as, for example, industrial control systems 100, 200, without additional set-up required.

An example production line structure and associated files is shown in TABLE 1.

system and method disclosed in the present specification, which can include a computer system 1012, as part of the system and method of managing a software program. The computer system 1012 includes a processor 1014, a system memory 1016, and a system bus 1018. The system bus 1018 couples system components including, but not limited to, the system memory 1016 to the processor 1014. The processor 1014 can be any of various available processors. Dual microprocessors and other multiprocessor architectures also can be employed as the processor 1014.

The system bus 1018 can be any of several types of bus structure(s) including the memory bus or memory controller, a peripheral bus or external bus, and/or a local bus using any variety of available bus architectures including, but not limited to, 9-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), Small Computer Systems Interface (SCSI) or other proprietary bus.

The system memory 1016 includes volatile memory 1020 and nonvolatile memory 1022. The basic input/output system (BIOS), containing the basic routines to transfer information between elements within the computer system 1012, such as during start-up, is stored in nonvolatile memory 1022. For example, the nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. Moreover, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

The computer system 1012 also includes removable/non-removable, volatile/non-volatile computer storage media.

TABLE 1

Example Production Line Structure and Associated Files

| Physical Structure | Stored Files | Software Structure | Stored Files |
|---|---|---|---|
| Assembly | (Source, View, BOM) | Controller | (Source, View, Parameters, BOM) |
| Sub-Assembly | (Source, View, BOM) | Module | (Source, View, Parameters, BOM) |
| Component | (Source, View, Properties) | Algorithm + Metadata | (Source, View, Parameters) |
| Component | (Source, View, Properties) | Algorithm + Metadata | (Source, View, Parameters) |
| Component | (Source, View, Properties) | Algorithm + Metadata | (Source, View, Parameters) |
| Component | (Source, View, Properties) | Algorithm + Metadata | (Source, View, Parameters) |
| Sub-Assembly | (Source, View, BOM) | Module | (Source, View, Parameters, BOM) |
| Component | (Source, View, Properties) | Algorithm + Metadata | (Source, View, Parameters) |
| Component | (Source, View, Properties) | Algorithm + Metadata | (Source, View, Parameters) |
| Component | (Source, View, Properties) | Algorithm + Metadata | (Source, View, Parameters) |
| Component | (Source, View, Properties) | Algorithm + Metadata | (Source, View, Parameters) |
| Assembly | (Source, View, BOM) | Controller | (Source, View, Parameters, BOM) |
| Sub-Assembly | (Source, View, BOM) | Module | (Source, View, Parameters, BOM) |
| Component | (Source, View, Properties) | Algorithm + Metadata | (Source, View, Parameters) |
| Component | (Source, View, Properties) | Algorithm + Metadata | (Source, View, Parameters) |
| Component | (Source, View, Properties) | Algorithm + Metadata | (Source, View, Parameters) |
| Sub-Assembly | (Source, View, BOM) | Module | (Source, View, Parameters, BOM) |
| Component | (Source, View, Properties) | Algorithm + Metadata | (Source, View, Parameters) |
| Component | (Source, View, Properties) | Algorithm + Metadata | (Source, View, Parameters) |
| Sub-Assembly | (Source, View, BOM) | Module | (Source, View, Parameters, BOM) |
| Component | (Source, View, Properties) | Algorithm + Metadata | (Source, View, Parameters) |
| Component | (Source, View, Properties) | Algorithm + Metadata | (Source, View, Parameters) |

Figure 10:
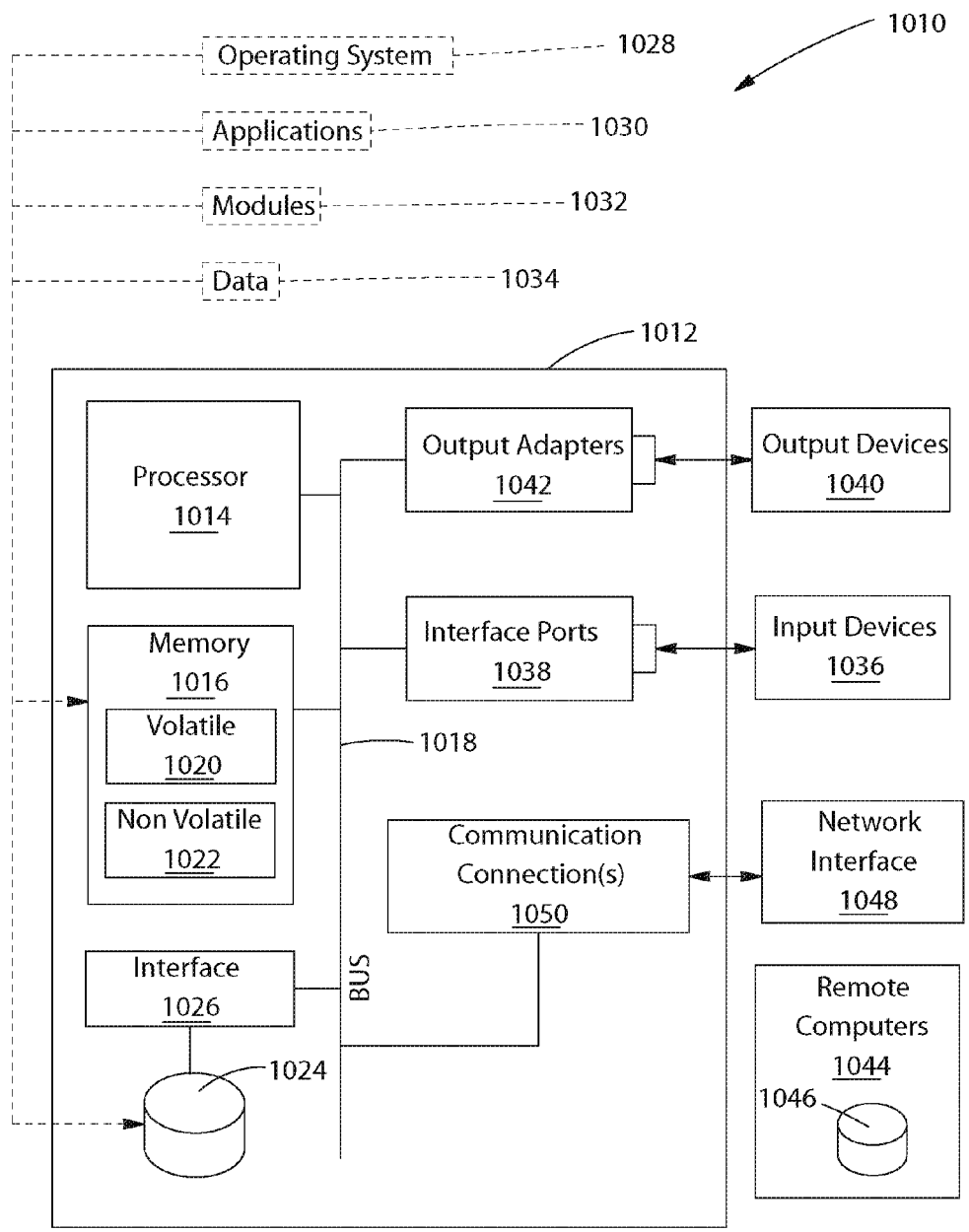
FIG. 10 illustrates an example environment for implementing various aspects of the computer-implemented system and method disclosed in the present specification, which can include a computer system, as part of the system and method of managing a software program.

FIG. 10 illustrates an example environment 1010 for implementing various aspects of the computer-implemented FIG. 10 illustrates, for example a disk storage 1024. The disk storage 1024 includes, but is not limited to, devices like a magnetic disk drive, floppy disk drive, tape drive, Jaz drive, Zip drive, LS-60 drive, flash memory card, or memory stick. In addition, the disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface 1026 is typically used.

It is to be appreciated that FIG. 10 describes software that acts as an intermediary between users and the basic computer resources described in a suitable operating environment 1010. Such software includes an operating system 1028. The operating system 1028, which can be stored on the disk storage 1024, acts to control and allocate resources of the computer system 1012. System applications 1030 take advantage of the management of resources by the operating system 1028 through program modules 1032 and program data 1034 stored either in the system memory 1016 or on the disk storage 1024. It is to be appreciated that various components described herein can be implemented with various operating systems or combinations of operating systems.

A user enters commands or information into the computer system 1012 through input device(s) 1036. The input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processor 1014 through the system bus 1018 via interface port(s) 1038. The interface port(s) 1038 include, for example, a serial port, a parallel port, a game port, and a universal serial bus (USB). The output device(s) 1040 use some of the same type of ports as input device(s) 1036. Thus, for example, a USB port may be used to provide input to the computer system 1012 and to output information from the computer system 1012 to an output device 1040. An output adapter 1042 is provided to illustrate that there are some output devices 1040 like monitors, speakers, and printers, among other output devices 1040 that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

The computer system 1012 can operate in a networked environment using logical connections to one or more remote computers, such as the remote computer(s) 1044. The remote computer(s) 1044 can be a personal computer, a server, a router, a network PC, a workstation, a microprocessor based appliance, a peer device or other common network node and the like, and typically includes many or all of the elements described relative to the computer system 1012. For purposes of brevity, only a memory storage device 1046 is illustrated with the remote computer(s) 1044. The remote computer(s) 1044 is logically connected to the computer system 1012 through a network interface 1048 and then physically connected via a communication connection 1050. The network interface 1048 encompasses communication networks such as local-area networks (LAN) and wide area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

The communication connection(s) 1050 refers to the hardware/software employed to connect the network interface 1048 to the bus 1018. While the communication connection 1050 is shown for illustrative clarity inside the computer system 1012, it can also be external to the computer system 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

As used herein, the terms "component," "system" and the like can also refer to a computer-related entity, either hardware, a combination of hardware and software, software, or software in execution, in addition to electro-mechanical devices. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

Figure 11:
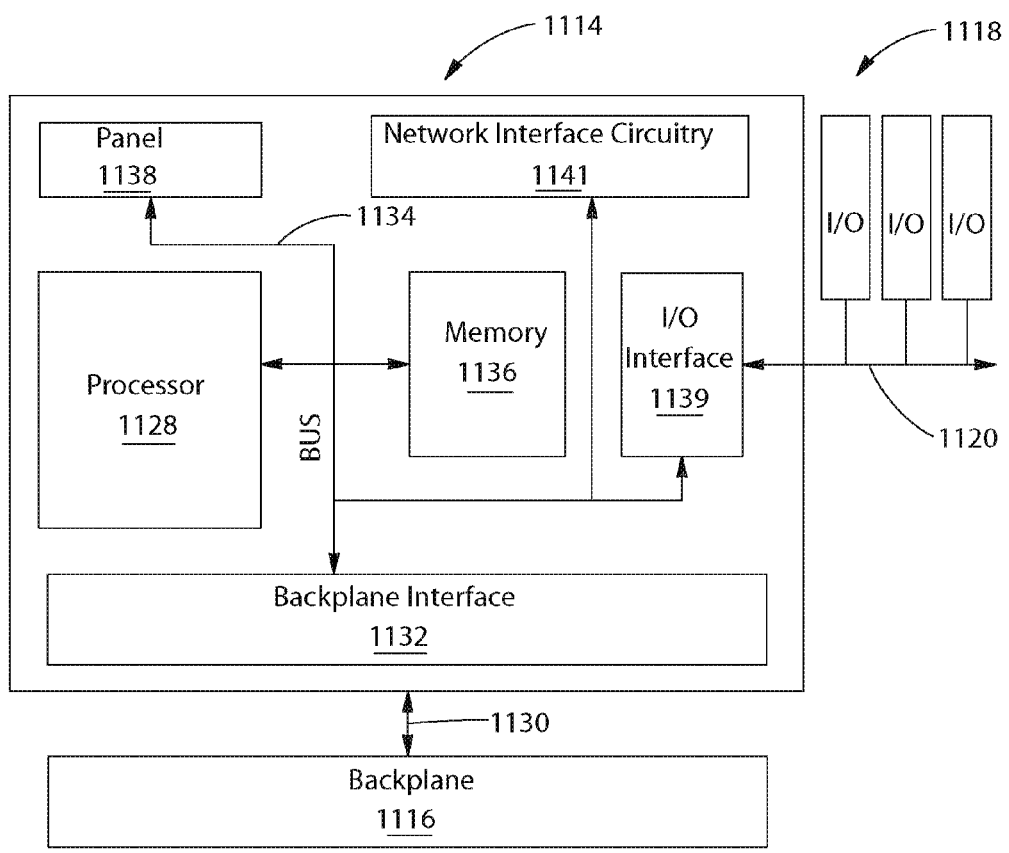
FIG. 11 illustrates an example environment of an industrial controller module that can employ a computer-implemented system and method of managing a software program in accordance with various aspects of the disclosed embodiments.

FIG. 11 illustrates an example environment of an industrial controller module that can employ a computer-implemented system and method of managing a software program in accordance with various aspects of the disclosed embodiments. Each functional industrial controller module 1114 is attached to a backplane 1116 by means of a separable electrical connector 1130 that permits the removal of the industrial controller module 1114 from the backplane 1116 so that it may be replaced or repaired without disturbing other industrial controller modules 1114. The backplane 1116 provides the industrial controller module 1114 with both power and a communication channel to the other industrial controller modules 1114. Local communication with the other industrial controller modules 1114 through the backplane 1116 is accomplished by means of a backplane interface 1132 which electrically connects the backplane 1116 through the connector 1130. The backplane interface 1132 monitors messages on the backplane 1116 to identify those messages intended for the particular industrial controller module 1114, based on a message address being part of the message and indicating the message destination. Messages received by the backplane interface 1132 are conveyed to an internal bus 1134 in the industrial controller module 1114.

The internal bus 1134 joins the backplane interface 1132 with a memory 1136, a processor 1128, front panel circuitry 1138, I/O interface circuitry 1139, and communication network interface circuitry 1141. The processor 1128 can be a general purpose microprocessor providing for the sequential or parallel execution of instructions included within the memory 1136 and the reading and writing of data to and from the memory 1136 and the other devices associated with the internal bus 1134. The processor 1128 includes an internal clock circuit (not shown) providing the timing of the microprocessor 1128 but may also communicate with an external clock (not shown) of improved precision. The external clock may be a crystal controlled oscillator or other time standard including a radio link to an external time standard. The precision of the external clock may be recorded in the memory 1136 as a quality factor. The panel circuitry 1138 includes status indication lights such as are well known in the art and manually operable switches such as for locking the industrial controller module 1114 in the off state.

The memory 1136 can comprise control programs or routines executed by the processor 1128 to provide control functions, as well as variables and data necessary for the execution of those programs or routines. For I/O modules, the memory 1136 also may include an I/O table holding the current state of inputs and outputs received from and transmitted to the industrial controller module 1114 via the I/O modules 1120, shown here located on I/O network 1122, for example. The industrial controller module 1114 can be adapted to perform the various methodologies described herein, via hardware configuration techniques and/or by software programming techniques.

The various illustrative functional elements, logical blocks, modules, and circuits described in connection with the aspects disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format.

The functions of the various functional elements, logical blocks, modules, and circuits elements described in connection with the aspects disclosed herein may be performed through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, DSP hardware, read-only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

The various functional elements, logical blocks, modules, and circuits elements described in connection with the aspects disclosed herein may comprise a processing unit for executing software program instructions to provide computing and processing operations for the computer and the industrial controller. Although the processing unit may include a single processor architecture, it may be appreciated that any suitable processor architecture and/or any suitable number of processors in accordance with the described aspects. In one aspect, the processing unit may be implemented using a single integrated processor.

The functions of the various functional elements, logical blocks, modules, and circuits elements described in connection with the aspects disclosed herein may be implemented in the general context of computer executable instructions, such as software, control modules, logic, and/or logic modules executed by the processing unit. Generally, software, control modules, logic, and/or logic modules include any software element arranged to perform particular operations. Software, control modules, logic, and/or logic modules can include routines, programs, objects, components, data structures and the like that perform particular tasks or implement particular abstract data types. An implementation of the software, control modules, logic, and/or logic modules and techniques may be stored on and/or transmitted across some form of computer-readable media. In this regard, computer-readable media can be any available medium or media useable to store information and accessible by a computing device. Some aspects also may be practiced in distributed computing environments where operations are performed by one or more remote processing devices that are linked through a communications network. In a distributed computing environment, software, control modules, logic, and/or logic modules may be located in both local and remote computer storage media including memory storage devices.

Additionally, it is to be appreciated that the aspects described herein illustrate example implementations, and that the functional elements, logical blocks, modules, and circuits elements may be implemented in various other ways which are consistent with the described aspects. Furthermore, the operations performed by such functional elements, logical blocks, modules, and circuits elements may be combined and/or separated for a given implementation and may be performed by a greater number or fewer number of components or modules. As will be apparent to those of skill in the art upon reading the present disclosure, each of the individual aspects described and illustrated herein has discrete components and features which may be readily separated from or combined with the features of any of the other several aspects without departing from the scope of the present disclosure. Any recited method can be carried out in the order of events recited or in any other order which is logically possible.

It is worthy to note that any reference to "one aspect" or "an aspect" means that a particular feature, structure, or characteristic described in connection with the aspect is included in at least one aspect. The appearances of the phrase "in one aspect" or "in one aspect" in the specification are not necessarily all referring to the same aspect.

Unless specifically stated otherwise, it may be appreciated that terms such as "processing," "computing," "calculating," "determining," or the like, refer to the action and/or processes of a computer or computing system, or similar electronic computing device, such as a general purpose processor, a DSP, ASIC, FPGA or other programmable logic device, discrete gate or transistor logic, discrete hardware components, or any combination thereof designed to perform the functions described herein that manipulates and/or transforms data represented as physical quantities (e.g., electronic) within registers and/or memories into other data similarly represented as physical quantities within the memories, registers or other such information storage, transmission or display devices.

It is worthy to note that some aspects may be described using the expression "coupled" and "connected" along with their derivatives. These terms are not intended as synonyms for each other. For example, some aspects may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. With respect to software elements, for example, the term "coupled" may refer to interfaces, message interfaces, application program interface (API), exchanging messages, and so forth.

It will be appreciated that those skilled in the art will be able to devise various arrangements which, although not explicitly described or shown herein, embody the principles of the present disclosure and are included within the scope thereof. Furthermore, all examples and conditional language recited herein are principally intended to aid the reader in understanding the principles described in the present disclosure and the concepts contributed to furthering the art, and are to be construed as being without limitation to such specifically recited examples and conditions. Moreover, all statements herein reciting principles, aspects, and aspects as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present disclosure, therefore, is not intended to be limited to the exemplary aspects and aspects shown and described herein. Rather, the scope of present disclosure is embodied by the appended claims.

The terms "a" and "an" and "the" and similar referents used in the context of the present disclosure (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as," "in the case," "by way of example") provided herein is intended merely to better illuminate the invention and does not pose a limitation on the scope of the invention otherwise claimed. No language in the specification should be construed as indicating any non-claimed element essential to the practice of the invention. It is further noted that the claims may be drafted to exclude any optional element. As such, this statement is intended to serve as antecedent basis for use of such exclusive terminology as solely, only and the like in connection with the recitation of claim elements, or use of a negative limitation.

Groupings of alternative elements or aspects disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability.

While certain features of the aspects have been illustrated as described above, many modifications, substitutions, changes and equivalents will now occur to those skilled in the art. It is therefore to be understood that the appended claims are intended to cover all such modifications and changes as fall within the scope of the disclosed aspects.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A computer-implemented method of managing a software program, the computer comprising a processor, a memory, and an input/output interface for receiving and transmitting information to and from the processor, the computer providing a development environment for developing a set of instructions executable by a system, the method comprising:
   receiving, by the processor, a first program containing information in machine-readable form, the information representing a first set of instructions executable by the system;
   creating a configuration for the system based on the received information; and
   generating, by the processor, a second program containing a second set of instructions executable by the system based on the configuration, wherein the second set of instructions corresponds to at least one algorithm assembled in a nested hierarchy;
   parsing, by the processor, the first program to extract data associated with the information contained therein;
   creating, by the processor, a metadata program; and
   storing, by processor, the data extracted from the information contained in the first program in the metadata program;
   wherein parsing the first program, comprises:
      interpreting hierarchy definition data from the information;
      identifying fields which require definition; and
      determining a category for the algorithm represented by the information;
   wherein creating the configuration for the system based on the received information comprises:
      creating a logical structure representing a physical environment in which the system will be applied and functional capabilities of the system; and
      associating at least one algorithm with the logical structure.

2. The computer-implemented method of claim 1, wherein creating the configuration for the system based on the received information comprises locating the at least one algorithm associated with the logical structure in a nested hierarchy.

3. The computer-implemented method of claim 2, wherein creating the configuration for the system based on the received information comprises configuring any one of an option, variant, and parameter data associated with the at least one algorithm within the logical structure.

4. The computer-implemented method of claim 3, wherein generating the second program containing the second set of instructions executable by the system based on the configuration, comprises applying any of the option, variant, and parameter data to the at least one algorithm within the logical structure.

5. The computer-implemented method of claim 4, wherein applying any of the option, variant, and parameter data to the at least one algorithm within the logical structure comprises manipulating the extracted information in the at least one algorithm with at least one of the option, variant, and parameter data.

6. The computer-implemented method of claim 4, comprising:
   instantiating, by the processor, the at least one algorithm;
   assembling, by the processor, the instantiated at least one algorithm; and
   compiling, by the processor, the assembled instantiated at least one algorithm into a single program, wherein the single program is downloadable to the system.

7. A computer system for managing a software program, comprising:
   a processor;
   a memory coupled to the processor;
   and an input/output interface coupled to the processor, wherein the interface is operative to receive and transmit information to and from the processor;
   wherein the computer system provides a development environment for developing a set of instructions executable by a system; and
   wherein the processor is operative to:
   receive a first program containing information in machine-readable form, the information representing a first set of instructions executable by the system;
   create a configuration for the system based on the received information; and
   generate a second program containing a second set of instructions executable by the system based on the configuration, wherein the second set of instructions correspond to at least one algorithm assembled in a nested hierarchy;
   wherein the processor is operative to:
      parse the first program to extract data associated with the information contained therein;
      create a metadata program; and
      store the data extracted from the information contained in the first program in the metadata program;
   wherein to parse the first program, the processor is operative to:
      interpret hierarchy definition data from the information;
      identify fields which require definition; and
      determine a category for the algorithm represented by the information;
   wherein to create the configuration for the system based on the received information, the processor is operative to:
      create a logical structure representing a physical environment in which the system will be applied and functional capabilities of the system; and
      associate at least one algorithm with the logical structure.

8. The computer system of claim 7, wherein to create the configuration for the system based on the received information, the processor is operative to locate the at least one algorithm associated with the logical structure in a nested hierarchy.

9. The computer system of claim 8, wherein to create the configuration for the system based on the received information, the processor is operative to configure any one of an option, variant, and parameter data associated with the at least one algorithm within the logical structure.

10. The computer system of claim 9, wherein to generate the second program containing the second set of instructions executable by the system based on the configuration, the processor is operative to apply any of the option, variant, and parameter data to the at least one algorithm within the logical structure.

11. The computer system of claim 10, wherein to apply any of the option, variant, and parameter data to the at least one algorithm within the logical structure, the processor is operative to manipulate the extracted information in the at least one algorithm with at least one of the option, variant, and parameter data.

12. The computer system of claim 10, wherein the processor is operative to:
   instantiate the at least one algorithm;
   assemble the instantiated at least one algorithm; and
   compile the assembled instantiated at least one algorithm into a single program, wherein the single program is downloadable to the system.

13. An apparatus comprising a memory containing instructions that if executed by a processor enable a system to:
   receive a first program containing information in machine-readable form, the information representing a first set of instructions executable by the system;
   create a configuration for the system based on the received information; and
   generate a second program containing a second set of instructions executable by the system based on the configuration, wherein the second set of instructions correspond to at least one algorithm assembled in a nested hierarchy;
   wherein the apparatus contains instructions that if executed by a processor are operative to:
      parse the first program to extract data associated with the information contained therein;
      create a metadata program; and
      store the data extracted from the information contained in the first program in the metadata program;
   wherein to parse the first program, the processor is operative to:
      interpret hierarchy definition data from the information;
      identify fields which require definition; and
      determine a category for the algorithm represented by the information;
   wherein to create the configuration for the system based on the received information, the processor is operative to:
      create a logical structure representing a physical environment in which the system will be applied and functional capabilities of the system; and
      associate at least one algorithm with the logical structure.

* * * * *